United States Patent [19]

Stanley

[11] Patent Number: 5,481,821
[45] Date of Patent: Jan. 9, 1996

[54] SPINNER BLADE AND FISHING LURE USING THE SAME

[76] Inventor: Lonnie D. Stanley, P.O. Box 722, Huntington, Tex. 75949

[21] Appl. No.: 306,721

[22] Filed: Sep. 15, 1994

Related U.S. Application Data

[63] Continuation of Ser. No. 980,163, Nov. 23, 1992, abandoned.

[51] Int. Cl.$^6$ ................................................ A01K 85/00
[52] U.S. Cl. ........................................ 43/42.13; 43/42.5
[58] Field of Search ............................ 43/42.13, 43.5, 43/42.47, 42.49

[56] References Cited

U.S. PATENT DOCUMENTS

| | | | |
|---|---|---|---|
| 2,923,084 | 2/1960 | Newman | 43/42.5 |
| 3,568,351 | 3/1971 | Perrin | 43/42.5 |
| 3,981,096 | 9/1976 | Tononen | 43/42.5 |
| 4,003,154 | 1/1977 | Carver | 43/42.13 |
| 4,037,345 | 7/1977 | Dubois | 43/42.5 |
| 4,155,192 | 5/1979 | Varaney | 43/42.5 |
| 4,571,877 | 2/1986 | Montgomery | 43/42.13 |
| 4,625,448 | 12/1986 | Borders | 43/42.13 |
| 4,640,041 | 2/1987 | Stanley | 43/42.13 |
| 4,888,908 | 12/1989 | Morris | 43/42.13 |
| 4,926,577 | 5/1990 | Radtchenko | 43/42.5 |
| 5,009,023 | 4/1991 | Hoyt | 43/42.5 |

*Primary Examiner*—P. Austin Bradley
*Assistant Examiner*—Chuck Y. Mah
*Attorney, Agent, or Firm*—Harold H. Dutton, Jr.

[57] ABSTRACT

A spinner blade for fishing lures comprising a body portion having an attachment aperture at one end thereof, the body being thinner at said one end than at the opposite end, whereby greater vibration is produced as the blade passes through the water; and a fishing lure incorporating the blade.

9 Claims, 1 Drawing Sheet

SPINNER BLADE AND FISHING LURE USING THE SAME

This application is a continuation of U.S. patent application Ser. No. 07/980,163 filed Nov. 23, 1992, now abandoned.

This invention relates to a spinner of the type commonly used on or with fishing tackle. More particularly, the invention relates to a unique spinner blade having a localized concentration of weight for affecting the balance of the blade and thereby altering the vibration caused by the blade.

BACKGROUND AND OBJECTS OF THE INVENTION

For many years, the sport fishing industry has made extensive use of spinners as an important part of many different fishing lures. Spinners are generally used to attract fish to the hook of the lure, and this is accomplished by the flash of light and the vibration caused by the spinner. Typically, a spinner is attached to a shank portion of a lure by means of a clevis, for example, and as the lure moves through the water, the spinner rotates, reflecting light and causing vibration. The speed of rotation is dependent upon the speed of retrieve and the velocity of any current through which the lure is being retrieved.

One common technique for enhancing the fish attracting ability of spinners is to alter the appearance, and thus the "flash" of the blade. The term "flash" refers to the nature of light reflection caused as the blade spins. Often, the blade is a polished metal blade, much like a mirror in appearance, in order that a high percentage of light impinging on the blade is reflected. Of course, as the blade spins, the light is reflected in many different directions. Improvements, enhancements and variations have been made to this aspect of spinners by creating different finishes on the blade. For example, painted finishes reflect light of different colors, and hammered blades reflect the light in more directions.

Other variations on spinners relate to the shape of the blade. These variations affect the nature of the vibrations generated as the blade spins in the water. Some blades are slightly oval in shape, while others take on a more elongated or "willow leaf" shape, and others a more "tear drop" shape. Depending upon the shape, such blades are known as "Colorado" blades, "Indiana" blades, or the like. Further, these different shapes are available in a variety of different sizes, in order that they may be tailored to the fishing conditions and the particular lure with which they are used. In essence, these blade variations are two dimensional in nature, and the variations can all be seen in a top view of the blades. The blades are of essentially uniform thickness. Even in the case of so-called "hammered" finishes, only uniform local variations are provided.

Most blades are cupped in their cross-sectional configuration, and thus changes in the shape necessarily changes the shape of the cupping, and thus the nature of the rotation of the blade in the water.

Multiple blades are also frequently used to increase the attractiveness of the lure to fish by increasing both the flash and the vibration.

In recent years, efforts have been made to generate even more vibration in the fishing lures using spinners, by modifying the lures themselves. For example, by mounting the blades on flexible, rather than rigid, shafts a greater amount of vibration is generated and is transmitted to the body of the lure and to the water. For example, U.S. Pat. No. 4,640,041 issued on Feb. 3, 1987 to the present inventor discloses such a fishing lure using single or multiple blades mounted on a shaft of reduced diameter, thereby allowing greater flexibility in the shaft. Other patents have used spring-like arms or plastic arms connected to the metal shafts to accomplish a similar effect.

One of the most popular type of fishing lure using spinners is commonly known as a "spinnerbait." This is the type of lure shown in prior U.S. Pat. No. 4,640,041, and comprises a generally V-shaped wire body, with a hook attached at one end of the wire and a lead weight molded around the hook/wire connection. The other end of the V-shaped wire has one or more spinner blades attached, by clevises, swivels, snaps, or the like. These blades generally have a hole at one end to enable the attachment while the other end of the blade is free to spin, generating the flash and vibration. Such lures have a great amount of versatility and have great popularity under a wide variety of fishing conditions, but all use some type of spinner blade.

DESCRIPTION OF THE INVENTION

The present invention provides a new spinner blade which increases the amount of vibration generated as the blade (and lure) is pulled through the water. According to the present invention, which can be applied to any prior art shape of spinner blade, the blade is made to have a tapered thickness. Generally, the end of the blade farthest away from the attaching aperture will be the thickest part of the blade, and the thickness will gradually decrease toward the attaching point of the blade, i.e. the hole provided in one end. In this manner, the weight of the blade is concentrated at the end of the blade which is freely spinning, thus greatly increasing the amount of vibration generated by the blade. For reference purposes, the term "end" is used to signify a portion near the edge of the blade at which the blade is attached to the lure, as well as the portion near the opposite edge.

As indicated, this invention can be applied to any shape of blade, whether oval, tear drop, willow leaf, or any other shape. Since the attaching hole is generally located at one end of the blade, that end does rotate, for example by a swivel attachment, but very little movement off of the axis of rotation is encountered at that end of the blade. By contrast, the other end of the blade, opposite to or remote from the attaching point, is free to move in a large circle, the maximum radius of which is approximately equal to the distance between the attaching point and the remote end of the blade. By increasing the weight at the remote end, and decreasing the weight at the attaching end, the vibration generated in the water during rotation or spinning of the blade is greatly enhanced.

As a result, the vibration generated by a given size of blade will be increased; or, the same amount of vibration can be generated by a smaller size blade according to the invention. In this manner, a great range of variation is introduced into the fisherman's arsenal of lures.

Of course the blades according to the present invention can be used on the most common type of fishing lures presently using spinners, such as spinner baits, but the same blades can also be used on other types of lures as well, in the same manner as with prior art spinners. In addition, the same principle can be applied to other shapes of spinner blades such as propeller shapes, or even the triple wing configurations.

DESCRIPTION OF THE DRAWINGS

The present invention will be described in greater detail with reference to the accompanying drawings which show by way of non-limiting example one embodiment of the same invention. In these drawings

DETAILED DESCRIPTION OF PREFERRED EMBODIMENTS

Figure 1:
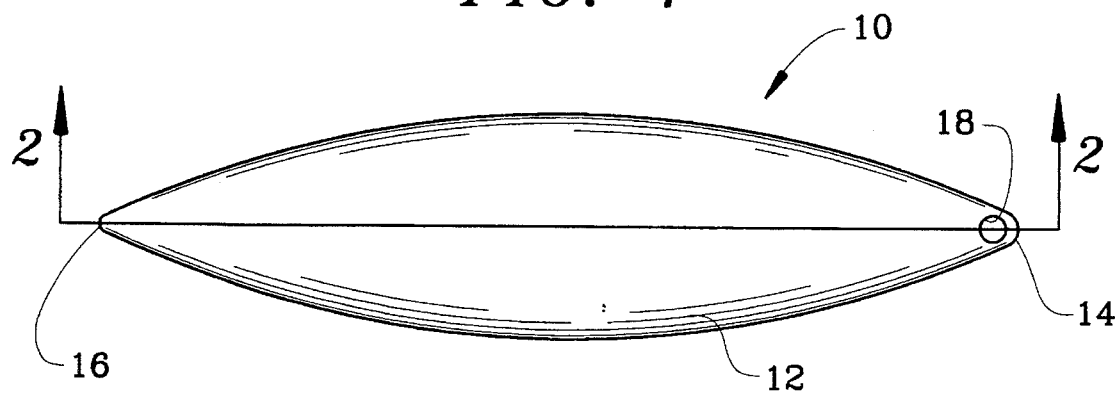
FIG. 1 is a top plan view of one embodiment of a spinner blade according to the invention.

The blade shown in the drawings is of a shape commonly referred to as a "willow leaf" shape because of the resemblance to the leaves of willow trees. The blade, generally designated 10, has an elongated body 12, with slightly pointed ends 14 and 16. An aperture 18 is provided at one end 14, and this aperture is used for attaching the blade to a fishing lure. Typically a snap, a clevis or a swivel would engage the blade through the aperture to attach the blade to the lure.

Figure 2:
FIG. 2 is a longitudinal cross-sectional view of the blade of FIG. 1 along line 2—2 and viewed in the direction of the arrows.

As is seen in FIG. 2, the thickness of the blade body 12 is far greater at end 16 than at end 14. While the drawing is exaggerated in order to clearly show the variation in thickness, it will be appreciated that the greater the variation, the greater is the concentration of weight at the end 16 remote from the aperture 16. The variation in the thickness is preferably of essentially a uniform taper from one end to the other.

When the blade according to the present invention is attached to a spinner bait in a conventional manner, a significant increase in the vibration generated by the lure is noted by the fisherman. Of course the vibration is transmitted through the fishing line and the fishing rod to the fisherman, and the vibration is easily felt.

Preferably the thickness will vary from about 0.015 inch at the thinner end up to about 0.030 inch, or about double at the thicker end. Of course the amount of variation will depend greatly upon the size of the blade.

It will also be appreciated that the variation in thickness of the cupped body will result in a different radius of curvature on the two surfaces of the blade, which will in turn affect the performance of the blade as it passes through the water. In general, this also increases the amount of vibration generated by the blade.

Figure 3:
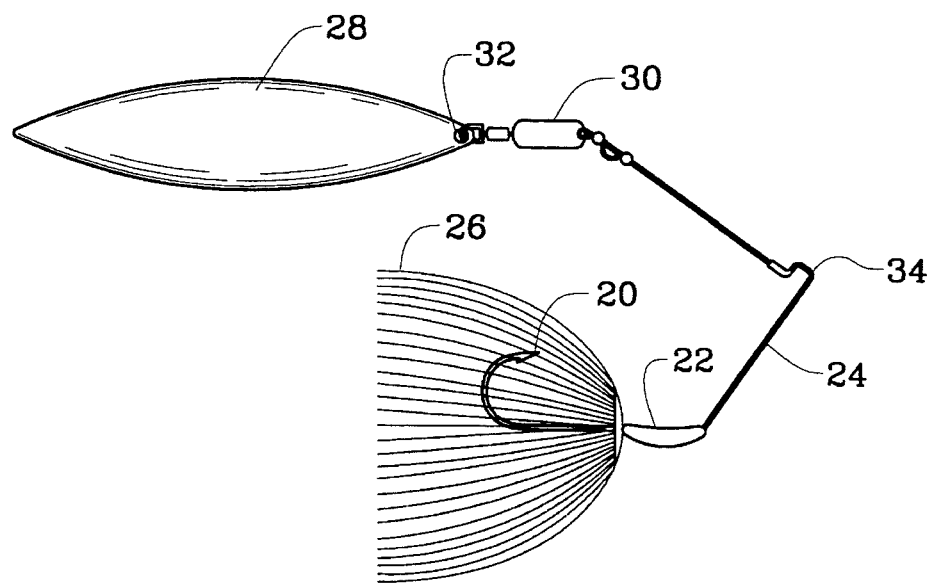
FIG. 3 is a side elevational view of a spinnerbait incorporating the blade of FIGS. 1 and 2.

FIG. 3 shows a spinnerbait type of lure having a hook 20, a weighted head portion 22, a V-shaped wire frame 24, a skirt portion 26 surrounding the hook, and a blade 28 of the type shown in FIGS. 1 and 2 attached to the end of the wire frame 24 by means of a swivel 30. Typically the swivel connects at an aperture 32 in the blade 28. The line is attached at the apex 34 of the wire frame. Thus, maximal vibration generated by the remote end of the blade 28 is created as the lure passes through the water.

A different shape blade would be attached in the same manner to the wire frame.

Thus great variations in the fish attracting characteristics of flash and vibration are achievable with the present invention.

While this invention has been described as having certain preferred features and embodiments, it will be understood that it is capable of still further variation and modification without departing from the spirit of the invention, and this application is intended to cover any and all variations, modifications and adaptations as fall within the spirit of the invention and the scope of the appended claims.

I claim:

1. A spinner blade for fishing lures of the type having a V-shaped wire frame with a hook at one end, said blade comprising an elongated body having means at one end thereof for attaching the blade to the fishing lure, said body having a thickness which tapers uniformly from a maximum thickness at an opposite end to a minimum thickness at said one end of said blade.

2. A spinner blade for fishing lures as in claim 1 and wherein said attaching means comprises an aperture passing through said body.

3. A spinner blade for fishing lures as in claim 2 and wherein said body has a willow leaf configuration.

4. A spinner blade as in claim 1 and wherein the fishing lure comprises a spinnerbait.

5. A fishing lure comprising a V-shaped wire frame and a hook at one end thereof, and means for attaching a spinner blade to said lure at the other end of said wire frame, said spinner blade comprising an elongated body, said attaching means being located at one end of said body, and said body having a thickness which tapers uniformly from a maximum thickness at an opposite end to a minimum thickness at said one end of said blade.

6. A fishing lure as in claim 5 and wherein said means for attaching said blade includes an aperture formed in said blade.

7. A fishing lure as in claim 6 and wherein the blade has a willow leaf configuration.

8. A fishing lure as in claim 5 and wherein said lure comprises a spinnerbait.

9. A fishing lure as in claim 5 and wherein said lure includes a weight formed about said wire adjacent said hook.

* * * * *